US009804996B2

(12) United States Patent
O'Connor et al.

(10) Patent No.: US 9,804,996 B2
(45) Date of Patent: Oct. 31, 2017

(54) COMPUTATION MEMORY OPERATIONS IN A LOGIC LAYER OF A STACKED MEMORY

(71) Applicant: Advanced Micro Devices, Inc., Sunnyvale, CA (US)

(72) Inventors: James M. O'Connor, Austin, TX (US); Nuwan S. Jayasena, Sunnyvale, CA (US); Gabriel H. Loh, Bellevue, WA (US); Michael Ignatowski, Austin, TX (US); Michael J. Schulte, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 737 days.

(21) Appl. No.: 13/724,506

(22) Filed: Dec. 21, 2012

(65) Prior Publication Data

US 2014/0181483 A1    Jun. 26, 2014

(51) Int. Cl.
*G06F 7/38* (2006.01)
*G06F 9/00* (2006.01)
*G06F 9/44* (2006.01)
*G06F 15/78* (2006.01)

(52) U.S. Cl.
CPC ...... *G06F 15/7821* (2013.01); *Y02B 60/1207* (2013.01); *Y02B 60/1225* (2013.01)

(58) Field of Classification Search
CPC .................................................. G06F 15/7821
USPC ......................................................... 712/220
See application file for complete search history.

(56) References Cited

U.S. PATENT DOCUMENTS

| | | | |
|---|---|---|---|
| 8,645,404 B2* | 2/2014 | Aithal et al. | 707/758 |
| 9,203,671 B2* | 12/2015 | Xu | G06F 17/142 |
| 2006/0200634 A1* | 9/2006 | Yoshida et al. | 711/148 |
| 2012/0182639 A1* | 7/2012 | Hostetter | G06F 3/061 |
| | | | 360/15 |

OTHER PUBLICATIONS

Pawlowski, J. Thomas, "Hybrid Memory Cube: Breakthrough DRAM Performance with a Fundamentally Re-Architected DRAM Subsystem," HotChips 23, Micron Technology, Inc., 24 pages (2011).
Patterson, et al., "Intelligent RAM (IRAM): Chips that Remember and Compute," IEEE International Solid-State Circuits Conference, pp. 224-225 (1997).

* cited by examiner

*Primary Examiner* — Chun-Kuan Lee
(74) *Attorney, Agent, or Firm* — Volpe and Koenig, P.C.

(57) ABSTRACT

Some die-stacked memories will contain a logic layer in addition to one or more layers of DRAM (or other memory technology). This logic layer may be a discrete logic die or logic on a silicon interposer associated with a stack of memory dies. Additional circuitry/functionality is placed on the logic layer to implement functionality to perform various computation operations. This functionality would be desired where performing the operations locally near the memory devices would allow increased performance and/or power efficiency by avoiding transmission of data across the interface to the host processor.

29 Claims, 2 Drawing Sheets

COMPUTATION MEMORY OPERATIONS IN A LOGIC LAYER OF A STACKED MEMORY

BACKGROUND

Field

Figure 1:
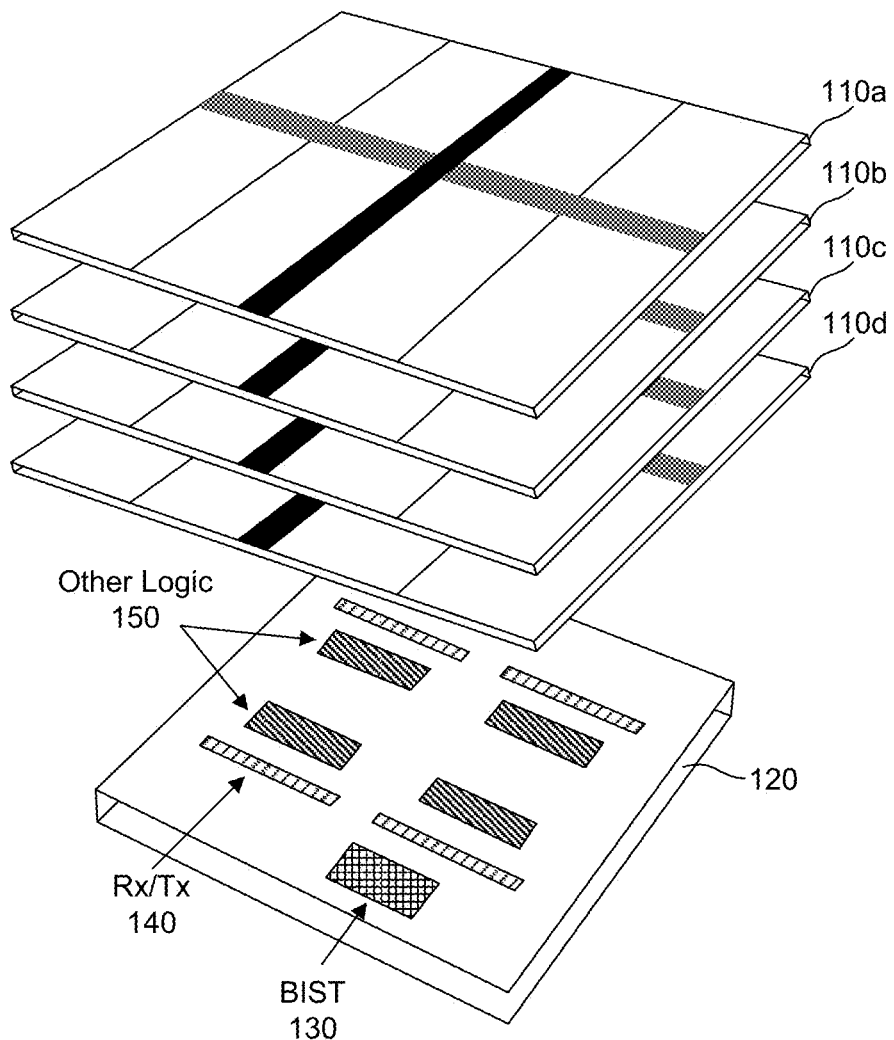

The disclosed embodiments relate generally to computer systems, and in particular to computation memory operations in memory management.

Background Art

Computer systems of various types are ubiquitous in modern society. Common to these computer systems is the storage of data in memory, from which processors perform read, write and other access instructions. Considerable portions of resources in computer systems are employed with the execution of these instructions.

Computer systems typically use processors, where the term "processor" generically refers to anything that accesses memory in a computing system. Processors typically load and store data to/from memory by issuing addresses and control commands on a per-data-item basis. Here a data item may be a byte, a word, a cache line, or the like, as the particular situation requires. These data accesses require a separate address and one or more commands to be transmitted from the processor to memory for each access even though the sequence of accesses follows a pre-defined pattern, such as a sequential stream. In some memory technologies, such as DRAM (dynamic random access memory), multiple commands may be required for some or all of the desired access.

The transmission of the memory addresses and associated commands consumes power and may introduce performance overheads in cases where the address/command bandwidth becomes a bottleneck. Furthermore, issuing addresses and control commands on a per-data-item basis may limit opportunities to optimize memory accesses and data transfers.

Existing solutions use the logic layer to implement interconnect networks, built-in-self-test, and memory scheduling logic. It does not appear that support for reduction computations in the logic layer has been proposed or disclosed. Past proposals to implement additional logic directly in the memory are expensive and have not proven to be practical because the placement of logic in a memory chip incurs significant costs in the memory chips, and the performance is limited due to the inferior performance characteristics of the transistors used in memory manufacturing processes. Existing solutions rely on logic and functionality implemented directly in the memory chip with the disadvantages described above, or are implemented on an external chip (e.g., a memory controller on a CPU/GPU chip), which requires special logic and support on the CPU/GPU/memory controller and requires additional data transfers between the CPU/GPU and memory.

BRIEF SUMMARY OF THE EMBODIMENTS

Therefore, what is needed are memory systems using multiple silicon chips within a single package, for example a memory chip three-dimensionally integrated with a logic/interface chip. The additional logic chip provides opportunities to integrate additional functionality not normally provided by memory systems. The functionality of this logic chip could be implemented on a silicon interposer on which the memory chips as well as other processing chips are stacked.

Embodiments use the logic functions to implement additional functionality to perform data computations associated with data in the associated memory chips. For instance, a reduction operation that computes the maximum value in an array can be performed in the logic associated with a memory stack to read the memory elements associated with an array, compute the maximum value, and return only this maximum value to the host processor.

Embodiments use die-stacked memories that contain a logic layer in addition to one or more layers of DRAM (or other memory technology). This logic layer can be a discrete logic die or logic on a silicon interposer associated with a stack of memory dies. Embodiments place additional circuitry/functionality on the logic layer to implement functionality to perform various "reduction" computation operations. This functionality is desired where performing the operations locally near the memory devices allows for increased performance and/or power efficiency by avoiding transmission of data across the interface to the host processor.

Embodiments provide a method of and an apparatus for executing a computation instruction by a logic chip. The embodiments include receiving, by a logic chip, a computation instruction from a processor, where the computation instruction includes a memory access instruction and one or more descriptors. In one example, the logic chip and a memory chip form a memory device. The embodiments further include decoding, by the logic chip, the computation instruction to provide addresses of two or more data elements in the memory chip. The decoding is based on the one or more descriptors. The embodiments include accessing the two or more data elements based on the memory access instruction. Finally, the embodiments include performing one or more computation operations on the two or more data elements.

Further embodiments, features, and advantages of the disclosed embodiments, as well as the structure and operation of the various embodiments are described in detail below with reference to the accompanying drawings.

BRIEF DESCRIPTION OF THE DRAWINGS/FIGURES

The accompanying drawings, which are incorporated herein and form part of the specification, illustrate the disclosed embodiments and, together with the description, further serve to explain the principles of the disclosed embodiments and to enable a person skilled in the relevant art(s) to make and use the disclosed embodiments.

FIG. 1 illustrates a multi-chip memory device, in accordance with an embodiment

Figure 2:
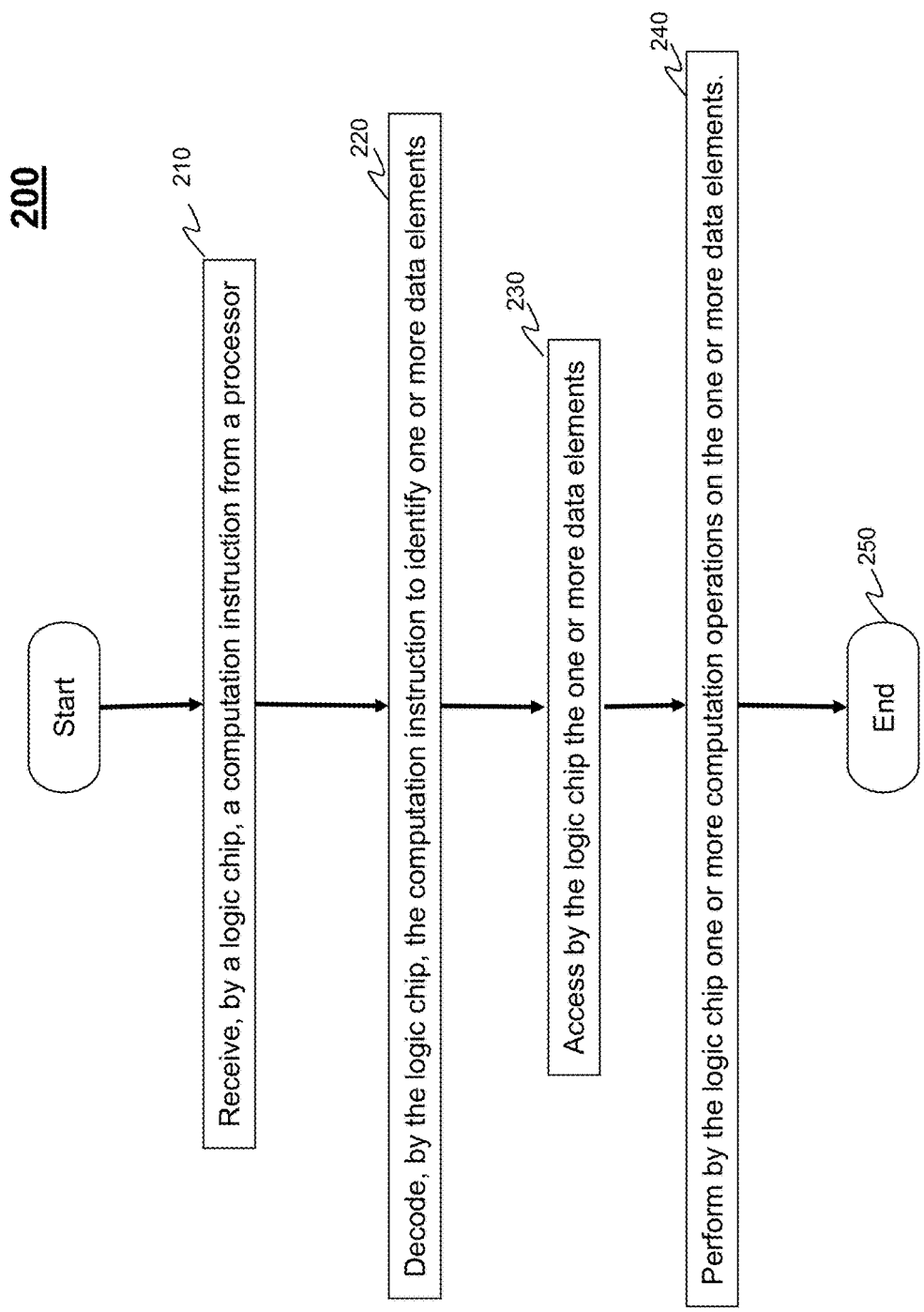

FIG. 2 provides a flowchart depicting a method for a computation instruction, in accordance with some embodiments.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Traditional memory chips implement all memory storage components and peripheral logic/circuits (e.g., row decoders, input/output (I/O) drivers, test logic) on a single silicon chip. Embodiments propose a split of the memory cells into one or more silicon chips, and the placement of logic/circuits (or a subset of the logic and circuits) onto a separate logic chip. A separate logic chip offers an advantage in that it can be implemented with a different fabrication process technology that is better optimized for power and performance of the logic and circuits. In contrast, the process used for memory chips may be optimized for memory cell density and low leakage, and so the circuits implemented on these memory processes may have very poor performance. The availability of a separate logic chip provides the opportunity to add value to the memory system by using the logic chip to implement additional functionality. In a further embodiment, the logic functionality can be implemented directly on an interposer, in which both the memory and the processor dies are stacked, rather than implementing this functionality on a separate logic chip.

FIG. 1 shows multi-chip integrated memories 100 that include one logic layer 120 and one or more memory layers 110a-d. Logic layer 120 can include receiver/transmit functionality 140, built-in-self-test functionality 130 and other logic 150. Current memory systems provide a simple interface (e.g., receiver/transmit functionality 140), which allows clients (e.g., any other component of a larger system that communicates with the memory, such as an integrated or discrete memory controller) to read or write data to/from the memory, along with a few other commands specific to memory operation, such as refresh and power down.

Embodiments use this logic to implement functions to perform computation operations on the data stored in the associated memory dies. The classes of operations that are proposed include, but are not limited to: (1) reduction operations; (2) prefix scan operations; (3) scalar-vector operations; (4) vector-vector operations; (5) vector-scalar operations; (6) vector-to-vector operations; (7) string match operations; (8) bit-string match operations; (9) regular expression ("regex") match operations; (10) multiple find/match operations; and (11) packing operations. Further details of each of these particular operations are provided below.

Reduction Operations:

Reduction operations are a class of operations in which an operation is applied to all of the elements in a range of memory addresses, with the output being a single result. Examples of reduction operations include, but are not limited to: (1) minimum; (2) maximum; (3) sum; (4) product; (5) Boolean operations (such as OR, AND, and the like); and (6) mean. These examples are not intended to be limiting, but are exemplary reduction operations. These operations require a range of addresses (or start address and element count) and an operation (which encodes the size and data type of each element). The result is a single value.

An additional set of reduction operations uses a single input parameter in addition to the information above. These reduction operations include, but are not limited to: (1) find first element greater than (or less than or equal); (2) find nearest element; and (3) count elements greater than (or less than or equal).

Variations of the "find" operations could return either the value, the index or address of the found value, or treat the array as consisting of {key, value} pairs, where the "find" operation looks only at the keys and returns the result value, or finds an entry with a matching value and returns the corresponding key or index. Variations of these operations that start at the "end" address and iterate downwards toward the start address are possible as well. Variations of these operations can take a mask input, which is a bit mask specifying whether a given element in the vector participates in the operation.

Prefix Scan Operations:

Prefix scan operations operate on a range of addresses, performing an operation on each successive element that depends on the results of the previous result. These operations use a range of addresses (or start address and element count) and an operation (which encodes the size and data type of each element). The result is an array of the same number of elements as the request. Examples of the prefix scan operations include, but are not limited to: (1) prefix sum; (2) prefix product; (3) prefix min; (4) prefix max; and (5) prefix Booleans (AND, OR, and the like). Variations of these operations that start at the "end" address and iterate downwards toward the start address are possible as well. Variations of these operations can take a mask input that is a bit mask specifying whether a given element in the vector participates in the operation.

Scalar-Vector Operations:

These operations use a range of addresses (or start address and element count), an input parameter, and an operation (which encodes the size and data type of each element). The result is an array of the same number of elements as the request. Examples of scalar-vector operations include, but are not limited to: (1) add/subtract scalar; (2) multiply/divide by scalar; (3) clamp ({−input, +input}, {0, +input} and the like); (4) Boolean operation by a scalar; and (5) compare with a scalar (GT, LT, EQ, and the like). Variations of these operations can take a mask input that is a bit mask specifying whether a given element in the vector participates in the operation.

Vector-Vector Operations:

These vector-vector operations use a range of addresses (or start address and element count), an array of input values with the same number of elements as the array in memory, and an operation (which encodes the size and data type of each element). The result is an array of the same number of elements as the request. Examples of vector-vector operation include, but are not limited to: (1) vector add/subtract; (2) vector product/divide; (3) vector max; (4) vector min; (5) vector Booleans; and (6) vector compare (e.g., GT, LT, EQ, and the like). Variations of these operations can take a mask input that is a bit mask specifying whether a given element in the vector participates in the operation.

Vector-Scalar Operations:

These vector-scalar operations use a range of addresses (or start address and element count), an array of input values with the same number of elements as the array in memory, and an operation (which encodes the size and data type of each element). The result is a single value. Examples of the vector-scalar operations include, but are not limited to: (1) dot product (effectively a vector multiply followed with an add reduction); (2) any compound vector-vector operation with a reduction (more efficient as one step rather than two separate commands). Variations of these operations can take a mask input that is a bit mask specifying whether a given element in the vector participates in the operation.

Vector-to-Vector Operations:

These vector-to-vector operations take the address of an array of values, an operation, and possibly a data size. The result is an array of values of the same size as the input. The operation performed on the elements of the vector may include: (1) absolute value; (2) sign extension; (3) integer-to-floating-point conversion (or vice versa).

String Match Operations:

These string match operations take the address of an array of values (for example, an ASCII string, a Unicode string, etc.) along with a bound or length, and also a "target" array of values (i.e., the string to be found), and then return an index or a pointer to a matching location in the first array where the target string can be found (returns an index of −1 (or similar) or a NULL pointer if the target string cannot be found). Variations of these operations may return an index/pointer to the longest matching substring, or return the length of the longest matching substring. Variations of these operations may simply return true or false (1 or 0) if the target string is found. Variations on the substring operations may include a second argument that specifies a minimum required substring length to be considered as a successful match.

Bit-string Match Operations:

Similar to the string match operations above, bit-string match operations take the address of an array and either an end address or a length, and treats the contents as one continuous bit string (additional arguments may be provided to specify data size and bit ordering/endianness). The operation returns the location of the matching bit-string, where the bit-string may span more than one byte, word, etc. Variations also include those analogous to the above string match operations (e.g., longest bit-substring match). The return value of the operations is an index or pointer along with a bit offset to the matching location.

Regular Expression (Regex) Match Operations:

These operations are similar to the string match operations above, but instead of a fixed target array of values or target string to find, the "regex" match operation takes a string that represents some form of a "regex," or "regular expression" (perhaps with some bound on the complexity of the regex). The operation then returns an index/pointer to the location of a substring that matches the "regex." Variations may return the first matching substring, the last matching substring, the shortest matching substring, the longest matching substring, etc.

Multiple Find/Match Operations:

These multiple find/match operations are variations of the "find" operations (described above in reduction operations), the string/substring operations, the bit-string operations, or the regex match operations described above may include returning of multiple values. For example, an operation may return all of the locations of all instances of a given string, or all locations where substrings matched a given regex. The format of the returned value could be an array (up to the same size as the original string) where the first N elements of the array are indices or pointers to the matched locations, or the return value could be a bit vector where a bit set to 1 indicates a match in the corresponding location of the original string. A variant of the regex plus multiple matching may include a "tokenizer" or lexer that returns the value (substring) of the next token, an index/pointer to the next token, or an array with indices/pointers to each individual token.

Packing Operations:

These packing operations take a vector/array of values, and a second vector of true/false (or 0/1) values or alternatively a bit vector, and then return an array/vector containing all of the elements of the first vector where there was a true/1 in the corresponding location of the second vector, but with all of these values compacted to the start of the returned array. For example: First vector=[ 48, 19, 23, 6, 18, 17, 32, 8]; Second vector=[ 0, 1, 0, 1, 1, 0, 0, 1]; Returned vector=[ 19, 6, 18, 8, 0, 0, 0, 0].

These operations may be combined with other operations, for example, to return a packed list of indices of all matching substring locations, or a packed array of all elements that are greater than a certain value. These could be implemented as two separate operations, or as a single compound operation (which will likely be more efficient).

Memory Interface:

The memory interface must be extended to support these functions. At the most basic level, the memory interface supports specifying a start address, end address (or count of elements), size of element, and operation (which implies a data type). The operations that use a parameter also use that parameter value. Certain embodiments may limit the size of the vectors. Furthermore, certain embodiments may limit whether vectors can span internal memory rows or banks.

The interface must also specify where to store the results of the operations. Operations that generate a scalar result specify a single memory address where the result is to be stored. Operations that generate a vector of results specify a start address, end address (or count of elements), and size of element. Alternative embodiments are also possible where operations that generate a scalar result return that result directly to the processor (or other system element) that issued the operation much like the response to a data load from memory. A packet based request/response interface can be extended to support the required packet types to contain the required information for these new command types.

The memory interface may be extended to allow the specification of multiple commands/operations to enable more efficient processing of compound/complex operations. For example, a vector-vector add operation may be specified, followed by sum reduction that adds all of the elements from the result of the first operation together. These two operations may be more efficiently processed in the logic layer of the memory stack rather than sending the results of the first operation back to the processor and then performing the summation in a loop on the processor. Implementations that specify address descriptors in terms of physical or virtual addresses are covered under this disclosure. Note that virtually addressed descriptors use the logic layers stacked with memory to have access to virtual-to-physical address translations (e.g., via an input/output memory management unit (IOMMU) interface).

Address descriptors may also refer to memory locations located within the associated logic die (e.g., in the SRAM). This improves efficiency of the compound operations by reducing the number of (slower) DRAM accesses that would otherwise be required to service the intermediate results of the compound operations.

The logic layer can operate on cacheable or uncacheable data. The former would use the logic layer to initiate snoops for all referenced data, though utilizing a snoop filter located in the memory stack will greatly improve the performance and/or energy/power efficiency.

The circuits implementing and providing the described functionality may be realized through several different implementation approaches. For example, in one embodiment, the logic may be implemented in hard-wired circuits. In another embodiment, the logic may be implemented with programmable circuits (or a logic circuit with at least some programmable or configurable elements).

While embodiments has been described as being employed in a memory organization consisting of one logic chip and one or more memory chips, there may be other physical manifestations of embodiments that are also covered. For example, vertically stacking the logic chip with the one or more memory chips. Other organizations are possible, such as placing some or all of the logic on a separate chip horizontally on an interposer, implemented within the silicon interposer itself, or packaged together in a multi-chip module (MCM).

More than one logic chip may be included in the overall stack or system. Embodiments cover implementations for all memory technologies. Embodiments apply to memory systems implemented with one or more of dynamic random access memory (DRAM), static random access memory (SRAM), embedded DRAM (eDRAM), phase-change memory, memristors, spin-transfer torque magnetic random access memory (STT-MRAM), NOR flash, NAND flash, or other memory technologies.

As noted above, implementing computation and data movement mechanisms in the logic associated with the memory stack, instead of on the host chip (i.e., processor chip), can improve power and performance by reducing the amount of data that is required to be moved across the memory interface to the host. Implementing the computation and data movement mechanisms directly in the memory is expensive and not very practical because the placement of logic in a memory chip (as opposed to a separate logic chip as described herein) incurs significant costs in the memory chips, and the performance is limited due to the inferior performance characteristics of the transistors used in memory manufacturing processes.

FIG. 2 provides a flowchart of a method 200 that executes a computation instruction, according to an embodiment. It is to be appreciated the operations shown may be performed in a different order, and in some instance not all operations may be required. It is to be further appreciated that this method may be performed on one or more logic chips that read and execute these access instructions.

The process 200 begins at step 210. In step 210, a computation instruction is received by a logic chip from a processor. The computation instruction includes a memory access instruction and one or more descriptors.

In step 220, the computation instruction is decoded by the logic chip to provide addresses of two or more data elements based on the one or more multiple descriptors.

In step 230, the two or more data elements are accessed based on the memory access instruction.

In step 240, one or more computation operations are performed on the two or more data elements by the logic chip.

In step 250, method 200 ends.

The embodiments described, and references in the specification to "some embodiments," indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with particular embodiments, it is understood that it is within the knowledge of one skilled in the art to effect such feature, structure, or characteristic in connection with other embodiments whether or not explicitly described.

Embodiments may be implemented in hardware, firmware, software, or any combination thereof. For example, logic layer 120 in FIG. 1 may be implemented as a computing device that can execute computer-executable instructions stored on a computer readable medium as follows. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the inventive subject matter such that others can, by applying knowledge within the skill of the art, readily modify and/or adapt for various applications such specific embodiments, without undue experimentation, without departing from the general concept of the inventive subject matter. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method comprising:
    receiving, by a logic chip, a computation instruction from a processor, wherein the computation instruction includes a memory access instruction and one or more descriptors;
    decoding, by the logic chip, the computation instruction to identify one or more data elements in a memory chip, the decoding being based on the one or more descriptors, the memory chip and logic chip being integrated within a package and the memory chip being a chip that is separate from the logic chip within the package;
    accessing the one or more data elements based on the memory access instruction; and
    performing, by the logic chip, one or more computation operations on the one or more data elements by determining, for each of the one or more computation operations, an output value from: (i) a first operand identifying a first data element of the one or more data elements stored at a first memory address in the memory chip; and (ii) a second operand identifying either the first data element stored at the first memory address or a second data element of the one or more data elements stored at a second memory address in the memory chip, the performing being implemented without transmitting the one or more data elements to the processor;
    identifying, via a memory interface between the memory chip and the logic chip, for each computation operation, whether to store the corresponding output value in one or more memory addresses in the memory chip according to a determined type of computation operation; and on a condition that the identifying is directed to the memory chip, providing, for each of the one or more computation operations, the output value to the memory chip.

2. The method of claim 1, wherein the one or more computation operations include a reduction operation.

3. The method of claim 1, wherein the one or more computation operations include a prefix scan operation, the prefix scan operation being an operation on successive ones of the one or more data elements that depends on a previous result.

4. The method of claim 1, wherein the one or more computation operations include a scalar-vector operation, the scalar-vector operation applying a scalar operation to each of the one or more data elements.

5. The method of claim 1, wherein the one or more computation operations include a vector-vector operation, the vector-vector operation applying an operation to the one or more data elements to output a same size vector.

6. The method of claim 1, wherein the one or more computation operations include a vector-scalar operation, the vector-scalar operation being an operation on two same size vectors comprising the one or more data elements, with a resulting single value.

7. The method of claim 1, wherein the one or more computation operations include a vector-to-vector operation, the vector-to-vector operation being an operation performed on a vector of the one or more data elements, with a resulting vector of a same size as the vector of the one or more data elements.

8. The method of claim 1, wherein the one or more computation operations include a string match operation.

9. The method of claim 1, wherein the one or more computation operations include a bit-string match operation.

10. The method of claim 1, wherein the one or more computation operations include a regular expression ("regex") match operation, wherein a regex match operation includes one of a first matching substring, a last matching substring, a shortest matching substring or a longest matching substring.

11. The method of claim 1, wherein the one or more computation operations include an operation to return an array of pointers, the pointers being locations of a plurality of instances of occurrences of a string.

12. The method of claim 1, wherein the one or more computation operations include a packing operation, the packing operation returning a vector of values compacted to begin at a start of the vector, the values being values at locations in a first vector that correspond to locations in a second vector having a non-zero value or true value.

13. The method of claim 1, wherein the decoding by the logic chip further includes decoding by the logic chip mounted in a stacked memory, the stacked memory further including the memory chip.

14. The method of claim 1, further comprising:
providing, via the memory interface between the memory chip and the logic chip, for at least one of the first memory address and the second memory address: a start address; an end address or a count of the corresponding data element; a size of the corresponding data element; a type of computation operation; and a destination address to store the result of the computation operation.

15. An apparatus, comprising:
a memory chip; and
a logic chip coupled to the memory chip to form a memory device, the memory chip and logic chip being integrated within a single package and wherein the logic chip is configured to:
receive a computation instruction from a processor, wherein the computation instruction includes a memory access instruction and one or more descriptors;
decode the computation instruction to identify one or more data elements in the memory chip, the decoding being based on the one or more descriptors, the memory chip being a chip that is separate from the logic chip;
access the one or more data elements based on the memory access instruction; and
perform one or more computation operations on the one or more data elements by determining, for each of the one or more computation operations, an output value from: (i) a first operand identifying a first data element of the one or more data elements stored at a first memory address in the memory chip; and (ii) a second operand identifying either the first data element stored at the first memory address or a second data element of the one or more data elements stored at a second memory address in the memory chip, the performing being implemented without using the processor;
a memory interface between the memory chip and the logic chip configured to:
identify, for each computation operation, whether to store the corresponding output value in one or more memory addresses in the memory chip according to a determined type of computation operation; and
on a condition that the identifying is directed to the memory chip, provide, for each of the one or more computation operations, the output value to the memory chip.

16. The apparatus of claim 15, wherein the one or more computation operations include a reduction operation.

17. The apparatus of claim 15, wherein the one or more computation operations include a prefix scan operation, the prefix scan operation being an operation on successive ones of the one or more data elements that depends on a previous result.

18. The apparatus of claim 15, wherein the one or more computation operations include a scalar-vector operation, the scalar-vector operation applying a scalar operation to each of the one or more data elements.

19. The apparatus of claim 15, wherein the one or more computation operations include a vector-vector operation, the vector-vector operation applying an operation to the one or more data elements to output a same size vector.

20. The apparatus of claim 15, wherein the one or more computation operations include a vector-scalar operation, the vector-scalar operation being an operation on two same size vectors comprising the one or more data elements, with a resulting single value.

21. The apparatus of claim 15, wherein the one or more computation operations include a vector-to-vector operation, the vector-to-vector operation being an operation performed on a vector of the one or more data elements, with a resulting vector of a same size as the vector of the one or more data elements.

22. The apparatus of claim 15, wherein the one or more computation operations include a string match operation.

23. The apparatus of claim 15, wherein the one or more computation operations include a bit-string match operation.

24. The apparatus of claim 15, wherein the one or more computation operations include a regular expression ("regex") match operation, wherein a regex match operation includes one of a first matching substring, a last matching substring, a shortest matching substring or a longest matching substring.

25. The apparatus of claim 15, wherein the one or more computation operations include an operation to return an array of pointers, the pointers being locations of a plurality of instances of occurrences of a string.

26. The apparatus of claim 15, wherein the one or more computation operations include a packing operation, the packing operation returning a vector of values compacted to begin at a start of the vector, the values being values at locations in a first vector that correspond to locations in a second vector having a non-zero value or true value.

27. The apparatus of claim 15, wherein the logic chip and the memory chip are mounted together to form a stacked memory.

28. The apparatus of claim 15, wherein the memory interface is further configured to interface between the memory chip and the logic chip and provide for at least one of the first memory address and the second memory address: a start address; an end address or a count of the corresponding data element; a size of the corresponding data element; the type of computation operation; and a destination address to store the result of the computation operation.

29. A tangible non-transitory computer-readable medium having stored thereon computer-executable instructions, execution of which by a computing device cause the computing device to perform operations comprising:

receiving, by a logic chip, a computation instruction from a processor, wherein the computation instruction includes a memory access instruction and one or more descriptors;

decoding, by the logic chip, the computation instruction to identify one or more data elements in a memory chip, the decoding being based on the one or more descriptors, the memory chip and logic chip being integrated within a package and the memory chip being a chip that is separate from the logic chip within the package;

accessing the one or more data elements based on the memory access instruction;

performing, by the logic chip, one or more computation operations on the one or more data elements by determining, for each of the one or more computation operations, an output value from: (i) a first operand identifying a first data element of the one or more data elements stored at a first memory address in the memory chip; and (ii) a second operand identifying either the first data element stored at the first memory address or a second data element of the one or more data elements stored at a second memory address in the memory chip, the performing being implemented transmitting, for each of the one or more computation operations, the output value to the processor, the performing being implemented without transmitting the one or more data elements to the processor;

identifying, via a memory interface between the memory chip and the logic chip, for each computation operation, whether to store the corresponding output value in one or more memory addresses in the memory chip according to a determined type of computation operation; and on a condition that the identifying is directed to the memory chip, providing, for each of the one or more computation operations, the output value to the memory chip.

* * * * *